(12) United States Patent
Calin et al.

(10) Patent No.: US 8,050,671 B2
(45) Date of Patent: Nov. 1, 2011

(54) METHOD AND APPARATUS FOR NETWORK GROWTH PLANNING IN WIRELESS NETWORKS

(75) Inventors: Doru Calin, Manalapan, NJ (US); Thomas B. Morawski, Westfield, NJ (US); Luz Elena Pinzon, Concord, CA (US); Raymond Abbott Sackett, Romson, NJ (US); Haiping Zhang, Edison, NJ (US)

(73) Assignee: Alcatel Lucent, Paris (FR)

( * ) Notice: Subject to any disclaimer, the term of this patent is extended or adjusted under 35 U.S.C. 154(b) by 1077 days.

(21) Appl. No.: 11/556,495

(22) Filed: Nov. 3, 2006

(65) Prior Publication Data

US 2008/0108345 A1     May 8, 2008

(51) Int. Cl.
    *H04W 4/00* (2009.01)
(52) U.S. Cl. ........ 455/424; 455/423; 455/446; 455/453; 455/419; 370/341
(58) Field of Classification Search .................. 370/254, 370/255, 341; 455/405, 424, 446, 447, 448, 455/449, 423, 419, 453
    See application file for complete search history.

(56) References Cited

U.S. PATENT DOCUMENTS

| | | | | |
|---|---|---|---|---|
| 7,123,605 | B1 * | 10/2006 | Nadeem et al. | 370/341 |
| 7,142,868 | B1 * | 11/2006 | Broyles et al. | 455/453 |
| 2004/0190520 | A1 * | 9/2004 | Khawer et al. | 370/395.1 |
| 2004/0214583 | A1 * | 10/2004 | Graham et al. | 455/453 |
| 2005/0227699 | A1 * | 10/2005 | Schreuder et al. | 455/453 |

* cited by examiner

*Primary Examiner* — Pierre-Louis Desir
(74) *Attorney, Agent, or Firm* — Wall & Tong, LLP

(57) ABSTRACT

The invention includes a method and apparatus for determining network growth information for a radio access network (RAN) and a wired network supporting communications of the RAN (denoted as a core network). The method includes obtaining RAN configuration information including RAN component configuration information and RAN component connectivity information, obtaining actual traffic information and forecast traffic information for the RAN, and determining RAN growth information by correlating the actual traffic information and the forecast traffic information with the RAN configuration information, the RAN growth information indicating whether at least one additional RAN component is necessary to support the actual and forecast traffic. The method may further include determining network growth information associated with the core network using core network configuration information and at least a portion of the RAN growth information.

23 Claims, 10 Drawing Sheets

| CORE NETWORK GROWTH STATISTIC | BASELINE | ITERATION 1 | INTERATION 2 |
|---|---|---|---|
| Total SMs | 20 | 20 | 20 |
| Total PSU2 | 23 | 23 | 23 |
| Total FRPH4 | 590 | 595 | 595 |
| Total FRPH22 | 252 | 253 | 253 |
| Total Primary Erlangs on PSUs | 0 | 11579.45083 | 13895.34157 |
| Total Packet Pipes | 1639 | 1664 | 1758 |
| Total Number Spare FRPH 4 | 70 | 70 | 70 |
| Total PHV4 | 495 | 495 | 495 |
| Total Primary Data Erlangs on PSU | 0 | 594.8430105 | 713.8116459 |
| Total PHV5 | 82 | 82 | 82 |
| Total PHV6 | 4 | 4 | 4 |
| Total PHA1s | 0 | 0 | 0 |
| Total PHA2s | 44 | 44 | 44 |
| Total Number Spare FRPH 22 | 36 | 36 | 36 |
| Total STPH/PH3 | 0 | 0 | 0 |
| Total STPH/PH22 | 8 | 8 | 8 |
| Total QPH/PH3 | 0 | 0 | 0 |
| Total QPH/PH22 | 4 | 4 | 4 |
| Total DPH PHV4 | 0 | 0 | 0 |
| Total IFRPH PH4 | 2 | 2 | 2 |
| Total DPH PHV5 | 29 | 29 | 29 |
| Total PCFPH PHE2 | 0 | 8 | 8 |
| Total IFRPH PH22 | 6 | 6 | 6 |
| Total PH Misc | 10 | 10 | 10 |
| Total SM2K_60MM | 20 | 20 | 20 |
| Total SM_XC | 0 | 0 | 0 |
| Total PSU2 | 23 | 23 | 23 |
| Total PSU2e | 0 | 0 | 0 |

METHOD AND APPARATUS FOR NETWORK GROWTH PLANNING IN WIRELESS NETWORKS

FIELD OF THE INVENTION

The invention relates to the field of communication networks and, more specifically, to wireless network growth planning.

BACKGROUND OF THE INVENTION

Evolution by Wireless Network Operators (WNOs) from Second Generation (2G) to Third Generation (3G) wireless networks has produced an explosion in demand for services enabled by 3G wireless networks, while at the same time increasing network complexity. In order to prevent network under-provisioning resulting in quality-of-service (QoS) degradation, and network over-provisioning resulting in wasted capital, WNOs need to be able to accurately forecast network growth to ensure just-in-time capacity provisioning, as well as to ensure that the network remains optimized with respect to QoS. Unfortunately, existing methodologies for performing wireless network growth planning are inefficient and inaccurate, and, therefore, costly.

Existing wireless network growth planning methodologies tend to be manual and, thus, time consuming and error prone. Existing methodologies spread network growth analysis across engineering groups, thereby increasing risks of inconsistency due to different sets of localized rules used by different engineering groups, e.g., wireless engineers perform network capacity analysis for the radio access network while switch engineers perform network capacity analysis for the core switching network. Furthermore, existing methodologies are merely simplistic trending functions that use average values for similar network elements, failing to include network configuration information and cross-component utilization effects that account for network component interdependencies.

SUMMARY OF THE INVENTION

Various deficiencies in the prior art of determining network growth information for a radio access network (RAN) are achieved, in accordance with the principles of the invention, by a) obtaining, for existing components of the RAN, RAN configuration information, including RAN component configuration information and RAN component connectivity information, b) obtaining actual and forecast traffic information associated with the RAN, and c) determining RAN growth information by correlating the actual and forecast traffic information with the RAN configuration information.

The RAN includes an air interface, e.g., radio frequency (RF) carriers, and base station hardware supporting the air interface, and may further include backhaul linkage, e.g., logical backhaul capacity, between the base station hardware and a core network, i.e., a wired network supporting communications of the wireless RAN. The base station hardware facilitates the exchange of traffic between the air interface and the backhaul linkage to the core network. The RAN growth information indicates whether or not an additional RAN component is necessary to support the actual and forecast traffic and, if an additional RAN component is necessary, identifies the additional RAN component(s), e.g., additional RF carriers, additional base station hardware, additional logical backhaul capacity, and the like, necessary to support the actual and forecast traffic.

The RAN configuration information includes RAN component configuration information and RAN component connectivity information. The RAN component configuration information specifies the characteristics of each of the components of the RAN, e.g., the number of line cards per base station, number of radio frequency (RF) carriers per line card, and like RAN component configuration information. The RAN component connectivity information specifies the connectivity between RAN components, e.g., which RF carriers are supported by which line cards of the base stations, which line cards of the base station are served by which logical backhaul pipes providing backhaul transport for communications of the RAN, and like RAN component connectivity information.

The RAN actual traffic information indicates actual traffic actually supported by the RAN, which may include an instantaneous measure of the traffic actually supported by the RAN, an average measure of the traffic actually supported by the RAN, and like measures adapted to quantify actual traffic. The actual traffic may further, or alternatively, include actual traffic capable of being supported by the RAN. The RAN forecast traffic information indicates traffic forecast to need to be supported by the RAN, which may include any measure adapted to quantify forecast traffic, including a forecast of instantaneous traffic, a forecast of average traffic, and the like measures adapted to quantify forecast traffic.

In accordance with an aspect of the invention, the RAN growth information may be used to determine network growth information associated with a core network, i.e., a wired network supporting communications associated with the wireless RAN. The core network growth information is determined using network configuration information associated with the core network and at least a portion of the RAN growth information. The core network growth information indicates whether or not an additional core network component is required to support the actual and forecast traffic and, if an additional core network component is required, identifies the additional core network component, e.g., additional circuit switch hardware, additional packet switch hardware, additional controller hardware, and the like, necessary to support traffic of the RAN.

The present invention provides numerous improvements over existing wireless network growth planning methodologies. For example, the present invention provides significant reductions in expenses associated with wireless network growth planning activities, increases network component utilization which results in improved capital efficiency, enables long-term capital expenditure forecasts and short-term equipment deployment planning, and enables proactive management of quality of service through various network and traffic changes such as the addition of new customers and the introduction of new services, thereby improving long-term profitability for wireless service providers. Furthermore, the present invention further provides core network growth information using the RAN growth information.

BRIEF DESCRIPTION OF THE DRAWINGS

The teachings of the present invention can be readily understood by considering the following detailed description in conjunction with the accompanying drawings, in which:

FIG. 4B depicts one exemplary report including core network growth information;

To facilitate understanding, identical reference numerals have been used, where possible, to designate identical elements that are common to the figures.

DETAILED DESCRIPTION OF THE INVENTION

The present invention enables determination of RAN growth information and core network growth information. The RAN growth information may be determined using network configuration information associated with the RAN, actual traffic information associated with the RAN, and forecast traffic information associated with the RAN. The RAN growth information identifies new RAN components required to support the actual and forecast traffic. The core network growth information may be determined using network configuration information associated with the core network and at least a portion of the RAN growth information. The core network growth information identifies new core components required to support the actual and forecast traffic.

The present invention enables estimation of network growth requirements (e.g., numbers, types, capacities, and the like of network components such as network elements (e.g., base stations, digital circuit/packet switches, and the like), network element components (e.g., base station line cards, digital circuit/packet switch lines cards, and the like), network links, logical paths, and the like, as well as various combinations thereof) given actual traffic currently supported by the network and traffic forecasts indicative of the expected growth of traffic in the network. The network growth requirements may be determined using cross-element capacity analysis by which changes to capacity requirements of one network component may be used to determine changes to capacity requirements of one or more network components associated with that network component.

The present invention provides accurate, efficient network growth planning to maximize quality of service and capital efficiency while minimizing operational costs. The present invention produces a "bottom-up" end-to-end capacity planning model to provide multi-iterative equipment forecasting. By proactively managing quality of service through traffic changes (e.g., due to new customers, introduction of new services, and the like), while controlling new capital investment and operational costs, the present invention may improve long-term profitability for wireless service providers. By determining network component (e.g., nodes, links, and the like, as well as various combinations thereof) capacity over specified time periods, the present invention enables long-term capital expenditure forecasts and short-term equipment deployment planning.

Figure 1:
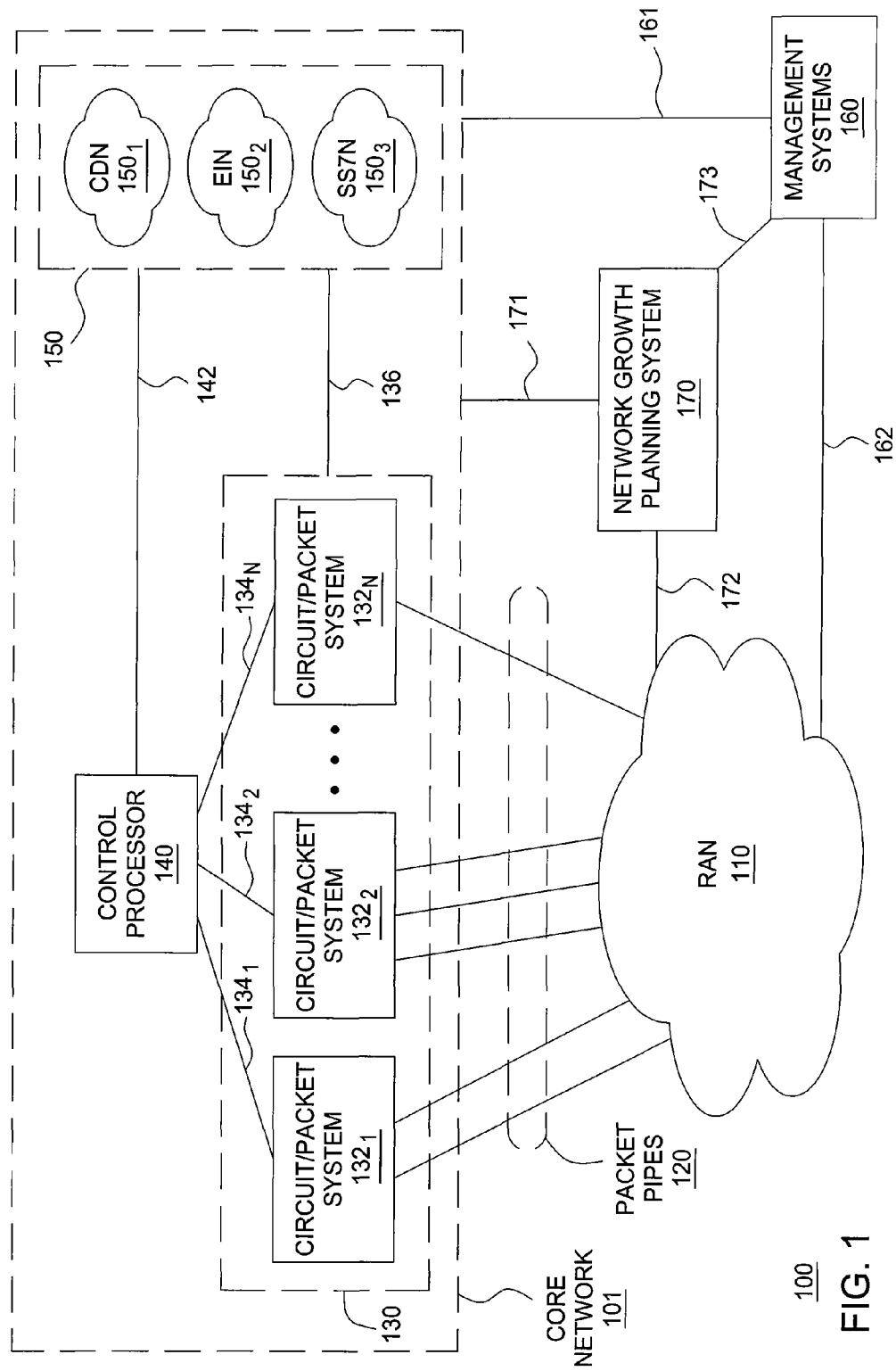
FIG. 1 depicts a high-level block diagram of a wireless communication network.

FIG. 1 depicts a high-level block diagram of a wireless communication network (WCN). Generally, WCN 100 uses an air interface (e.g., Code Division Multiple Access (CDMA), Time Division Multiple Access (TMDA), Frequency Division Multiple Access (FDMA), and the like) that is responsible for multiple user access. Specifically, WCN 100 includes a network segment that is decoupled from the radio transmissions over the air, namely a core network 101 (denoted as core network 101), and another network segment, namely a Radio Access Network (RAN) network 110 (denoted as RAN 110) that is responsible for supporting transmissions over the air interface which are subject to various radio propagation conditions. Hence, RAN 110 supports wireless communications for wireless user terminals, while core network 101 supports wireline communications associated with RAN 110, as well as various other networks. The RAN 110 and core network 101 operate together to support communications between various combinations of communication terminals (e.g., wireless-to-wireless or wireless-to-wireline communications).

The core network 101 includes a circuit and packet switching platform (CPSP) 130, a control processor (CP) 140, and a plurality of transport networks (TNs) 150 (collectively, TNs 150). The CPSP 130 includes a plurality of circuit and packet systems (CPSs) $132_1$-$132_N$ (collectively, CPSs 132) which may include digital circuit systems (DCSs), optical circuit systems (OCSs), and the like, as well as various combinations thereof. The CP 140 communicates with CPSs $132_1$-$132_N$, using a plurality of communication paths (CPs) $134_1$-$134_N$ (collectively, CPs 134), respectively, for controlling CPSs 132. The TNs 150 include a content distribution network (CDN) $150_1$, an experimental integrated network (EIN) $150_2$, and a Signaling System 7 network (SS7N) $150_3$. The CPSs 132 of CPSP 130 and CP 140 communicate with TNs 150 using communications paths 136 and 142, respectively.

As depicted in FIG. 1, core network 101 and RAN 110 communicate using a plurality of packet pipes (PPs) 120 (collectively, PPs 120). A packet pipe is a logical path between a network element in RAN 110 (e.g., a base station) and a network element in core network 101 (e.g., one of CSs 132). The PPs 120 are transported over carriers in a backhaul network. The backhaul network supporting PPs 120 may include digital circuit carriers (e.g., T1 carriers, T3 carriers, and the like), optical circuit carriers (e.g., Synchronous Optical Network (SONET) carriers, Optical Transport Networks (OTNs) carriers, and the like), and the like, as well as various combinations thereof. In one embodiment, each PP 120 may include a logical grouping of one or more DS0s.

As depicted in FIG. 1, WCN 100 includes management systems (MSs) 160. The MSs 160 may include any systems for managing core network 101 and RAN 110, including inventory management systems, service provisioning systems, network management systems, network monitoring systems, service billing systems, and the like, as well as various combinations thereof. The MSs 160 communicate with core network 101 using a communication path 171. The MSs 160 communicate with RAN 110 using a communication path 172. Although depicted as a single group of systems, management systems associated with core network 101 may be operated independently of management systems associated with RAN 110.

As depicted in FIG. 1, WCN 100 includes a network growth planning system (NGPS) 170. The NGPS 170 provides accurate, efficient network growth planning. The NGPS 170 is adapted for optimizing a current network configuration (i.e., ensuring optimum use of existing network capacity through analysis of current network capabilities and bottlenecks). The NGPS 170 is adapted for determining growth of RANs required to support projected network traffic. The NGPS 170 is adapted for determining growth of core networks required to support associated RANs. The NGPS 170 provides various network growth planning functions of the present invention. As depicted in FIG. 1, in support of network growth planning functions, NGPS 170 communicates with core network 101 and RAN 110 using communication paths 171 and 172, respectively.

The NGPS 170 may include one or more network growth planning modules. The NGPS 170 may further include various processors, memory, support circuits, and the like in support of functions performed by the network growth planning module(s). The NGPS 170 may further include one or more user interfaces enabling one or more users to configure and/or control various functions performed by the network growth planning module(s). For example, users may configure utilization thresholds for controlling whether the network is run hot (e.g., at a high capacity utilization, such as 90%) or cold (e.g., at a low capacity utilization, such as 60%). The various functions of NGPS 170 may be better understood with respect to FIG. 2-FIG. 4.

Figure 2:
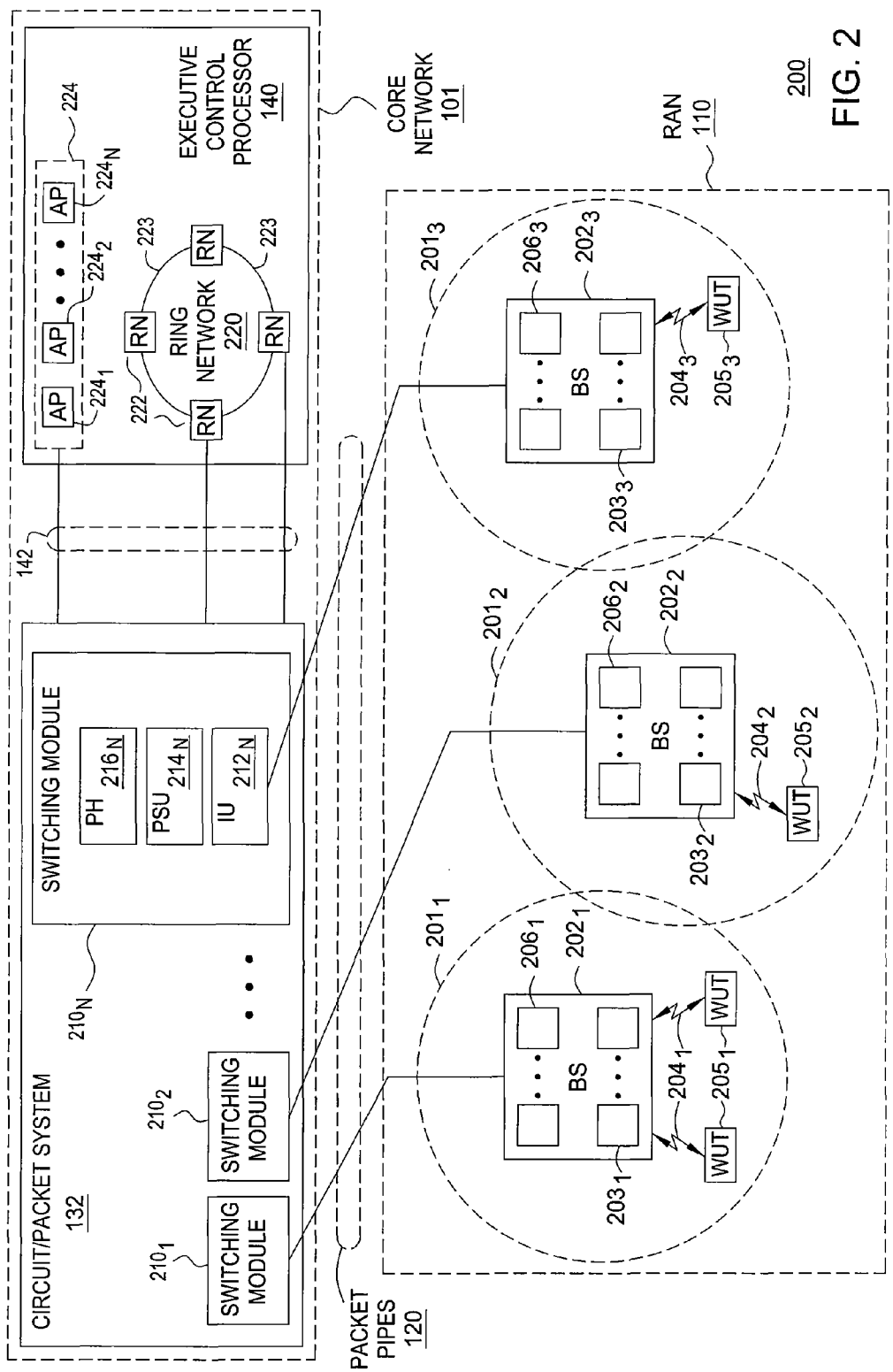
FIG. 2 depicts a high-level block diagram of a portion of the communication network of FIG. 1 including network components for which growth forecasts may be determined.

FIG. 2 depicts a high-level block diagram of a portion of the communication network of FIG. 1 including network components for which growth forecasts may be determined. Specifically, communication network 200 of FIG. 2 includes core network 101 and RAN 110. For purposes of clarity, core network 110 includes one of CPSs 132 (denoted as digital circuit and packet system (DCPS) 132) and CP 140 (denoted as executive control processor (ECP) 140). The RAN 110 supports wireless communications. The RAN 110 converts wireless communications to wireline communications for backhaul to core network 110 using PPs 120. The core network 101 provides switching, transport, control, and various other functions in support of wireless communications associated with RAN 110.

The RAN 110 includes a plurality of cell regions (CRs) $201_1$-$201_3$ (collectively, CRs 201) including a plurality of base stations (BSs) $202_1$-$202_3$ (collectively, BSs 202), respectively. The BSs $202_1$-$202_3$ include respective pluralities of wireless transceivers (WTs) $203_1$-$203_3$ (collectively, WTs 203). The WTs 203 support respective pluralities of wireless carriers (WCs) $204_1$-$204_3$ (collectively, WCs 204), e.g., radio frequency (RF) carriers. The WTs 203 and associated WCs 204 support wireless communications for respective pluralities of wireless user terminals (WUTs) $205_1$-$205_3$ (collectively, WUTs 205) which may include any wireless devices including phones, computers, and the like, as well as various combinations thereof.

The BSs 202 are responsible for processing radio signals both from and to multiple WUTs 205. In the uplink stream (data carried from WUTs 205 to the wireless network), BSs 202 provide the multiplexing function for multiple wireless communications carried out over the air interface via WCs 204 supported by WTs 203, handling the mapping of the multiple wireless communications to the backhaul segment of the network (illustratively, PPs 120) which links RAN 110 to core network 101. In the downlink stream (data carried from the wireless network to WUTs 205), BSs realize the mapping and multiplexing of communications conveyed from core network 101 over the backhaul segment of the network (illustratively, PPs 120) which links core network 101 to RAN 110 into the air interface segment (illustratively, WCs 204).

The BSs 202 include respective pluralities of cards $206_1$-$206_3$ (collectively, cards 206), including line cards, control cards, and the like, as well as various combinations thereof, adapted for converting between wireless and wireline communications. The cards 206 may vary for different wireless networks. For example, in a CDMA wireless network, cards 206 may include channel elements (CEs), Channel Card Units (CCUs), and like cards and components. For example, in other wireless networks, such as TDMA wireless networks, FDMA wireless networks, and the like, BSs 202 may be replaced by nodes operable for performing functions similar to BSs 202, as well as providing other functions which may be required by TDMA and FDMA wireless networks. In such other wireless networks, nodes may include various other types of line cards, control cards, and the like, as well as various combinations thereof.

The core network 101 includes DCPS 132 (e.g., 5ESS DCS). The DCPS 132 includes a plurality of switching modules (SMs) $210_1$-$210_N$ (collectively, SMs 210). The SMs $210_1$-$210_N$ include respective pluralities of interface units (IUs) $212_1$-$212_N$ (collectively, IUs 212), packet switching units (PSUs) $214_1$-$214_N$ (collectively, PSUs 214), and protocol handlers (PHs) $216_1$-$216_N$ (collectively, PHs 216). The IUs 212 may include Digital Line/Trunk Units (DLTUs), Digital Network Units—SONET (DNUSs), and like IUs (e.g., Optical Interface Units (OIUs) in optical circuit switches), as well as various combinations thereof. The PHs 216 may include voice-based protocol handlers (PHVs), data-based protocol handlers (PHDs), and the like, as well as various combinations thereof.

The BSs $202_1$-$202_N$ communicate with SMs $210_1$-$210_N$ using PPs 120. Although omitted for purposes of clarity, PPs 120, which include logical communication paths terminating on BSs 202 in RAN 110 and DCPSs 132 (more specifically, IUs 212 of SMs 210 of DCPSs 132) in core network 101, may be transported using one or more backhaul networks between RAN 110 and core network 101. As described herein, PPs 120 transport network traffic upstream from RAN 110 to core network 101 for providing various functions supported by core network 101 (e.g., circuit/packet switching, voice coding, application processing, and the like, as well as various combinations thereof) and downstream from core network 101 to RAN 110 for delivery to WUTs 205 using WCs 204.

The core network 101 includes ECP 140 (e.g., a 5ESS ECP). The ECP 140 provides control functions for supporting digital circuit/packet switches (illustratively, DCPS 132). The ECP 140 includes a ring network (RN) 220 comprised of a plurality of ring nodes (RNs) 222 (collectively, RNs 222) interconnected in a ring topology using a plurality of links 223 (collectively, links 223). The RNs 222 provide various functions in support of switching and other functions provided by DCPS 132. The ECP 120 includes a plurality of application processors (APs) $224_1$-$224_N$ (collectively, APs 224). The APs 224 provide various application processing functions for network traffic supported by DCPS 132. As depicted in FIG. 2, at least a portion of RNs 222 and APs 224 communicate with at least a portion of SMs 210 using CPs 134.

As depicted in FIG. 1 and FIG. 2, the components of a CDMA network may be viewed in terms of two sub-network categories—the RAN 110 and the core network 101. Depending on network design and capabilities, including the capability to respond to fluctuations in traffic demands, capacity bottlenecks may occur at various levels of the RAN and core sub-networks, thereby requiring detailed decomposition of the RAN and core sub-networks into elementary capacity segments in order to size the network components (e.g., nodes, cards, links, and the like, as well as various combinations thereof) for network growth planning (which may also be referred to herein as capacity growth planning).

The decomposition of the RAN and core sub-networks into elementary capacity segments is required because of the recognition that resource utilization depends not only on the capacity of the individual network components, but also on the configuration of the individual network components, as well as interactions between individual network components at the functional level. In one generic example, a change in RAN capacity requirements directly affects core network equipment requirements (e.g., protocol handlers and other components associated with packet pipes between RAN and core network portions). Other more specific examples, associated with the RAN and the core network individually, provide a better understanding of the recognition that resource utilization depends not only on the capacity of the individual network components.

Figure 3:
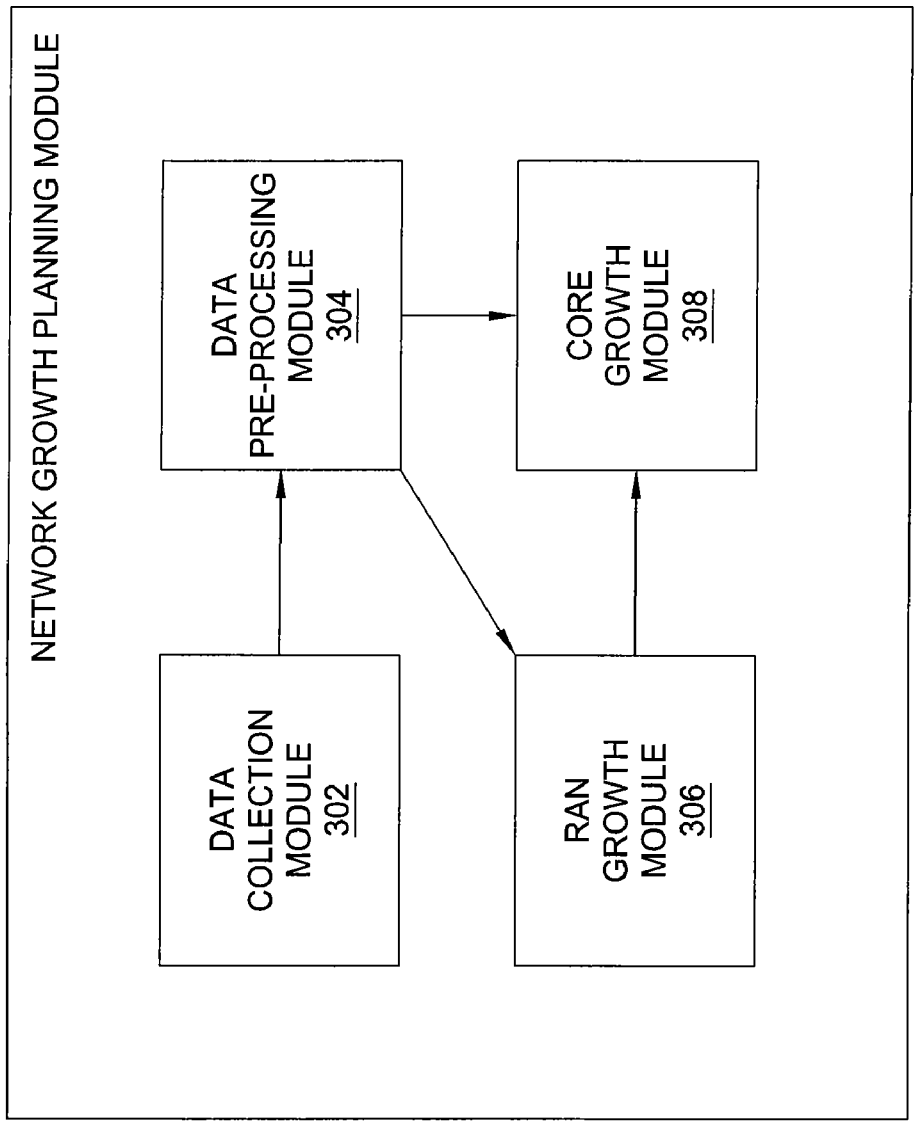
FIG. 3 depicts a high-level block diagram of a network growth planning module.

In a more specific example for the RAN, the effect of adding carriers to a cell site affects all carriers at the cell site, as well as all related equipment, due to the redistribution of traffic across the carriers (illustratively, as described herein with respect to at least step 308 of FIG. 3). In a more specific example for the core network, switching modules that are not balanced across carriers (a configuration issue) may lead to overloads of associated protocol handlers. The present invention accounts for such interactions between network portions, as well as individual network components within and across network portions, to provide accurate, efficient network growth planning. The network growth planning methodologies of the present invention may be better understood with respect to FIG. 3 and FIG. 4.

FIG. 3 depicts a high-level block diagram of a network growth planning module according to one embodiment of the present invention. Specifically, network growth planning module 300 includes a data collection module (DCM) 302, a data pre-processing module (DPM) 304, a RAN growth module (RGM) 306 (which may be alternatively referred to as a RAN capacity planning module), and a core growth module (CGM) 308 (which may be alternatively referred to as a core capacity planning module). Although omitted for purposes of clarity, network growth planning module 300 may interoperate with various input-output modules, processors, memory, controllers, and the like, as well as various combinations thereof for providing various functions depicted and described herein as being performed by network growth planning module 300.

As depicted in FIG. 3, DCM 302 collects network growth analysis information utilized by RGM 306 and CGM 308 to determine network growth planning information for a RAN and a core network, respectively. The DCM 302 provides the network growth analysis information to DPM 304, which pre-processes the network growth analysis information. The DPM 304 provides the pre-processed network growth analysis information to RGM 306 and CGM 308 for use in determining network growth planning information for the RAN (denoted as RAN growth planning information) and the core network (denoted as core growth planning information, respectively. The RGM 306 determines RAN growth planning information using the pre-processed network growth analysis information. The RGM 306 provides at least a portion of the RAN growth planning information to CGM 308. The CGM 308 determines core growth planning information using the pre-processed network growth analysis information and the RAN growth planning information.

The DCM 302 obtains information adapted for performing network growth analysis processing (denoted as network growth analysis information). The network growth analysis information includes network configuration information. The network configuration information includes RAN configuration information and core network configuration information. The network configuration information may include network inventory information. The network configuration information may include network capacity information such as numbers and types of each network element in the network (e.g., network capacity), numbers and types of cards (e.g., line cards, control cards, processors, and various other components) of each node in the network (e.g., unit capacity of each network element), and the like, as well as various combinations thereof. The network configuration information may include connectivity information (e.g., specifying connectivity between each of the network elements in the network, as well as between components of such network elements).

The network growth analysis information includes actual traffic information. The actual traffic information includes actual RAN traffic information associated with traffic currently supported by the RAN and actual core network traffic information associated with traffic currently supported by the core network. For the RAN, actual traffic information may be represented for the entire RAN or portions of the RAN (e.g., a group of one or more cell regions, per-BS, and the like, as well as various combinations thereof). For the core network, actual traffic information may be represented for the entire core network or a portion or portions of the core network (e.g., a group of one or more ECPs and associated DCSs, per-DCS, and the like, as well as various combinations thereof). The actual traffic information may be represented in terms of bandwidth (e.g., at various granularities).

The network growth analysis information includes forecast traffic information. The forecast traffic information is primarily associated with the RAN since RAN traffic drives the growth of the RAN, which in turn drives the growth of the core network. In one embodiment, however, at least a portion of the forecast traffic information may be associated with the core network. In one embodiment, forecast traffic information includes traffic volume forecasts. In one embodiment, traffic volume forecasts may be organized based on service type (e.g., voice traffic forecasts and data traffic forecasts). In one embodiment, at least a portion of the forecast traffic information may be derived by marketing organizations using data supplied by end-users.

In one embodiment, DCM 302 obtains at least a portion of the network configuration information and actual traffic information using auto-discovery capabilities in which DCM 302 (or an associated module) requests information from the network (illustratively, from RAN 110 and core network 101). In one embodiment, DCM 302 obtains at least a portion of the network configuration information and actual traffic information by retrieving the information from one or more management systems (e.g., inventory management systems, traffic monitoring systems, and the like, as well as various combinations thereof), as well as associated databases. In one embodiment, DCM 302 obtains at least a portion of the forecast traffic information using at least one of retrieval from one or more remote systems or databases, entry by one or more users, and the like, as well as various combinations thereof.

The DPM 304 receives network growth analysis information from DCM 302. The DPM 304 processes network growth analysis information received from DCM 302 to produce pre-processed network growth analysis information. The DPM 304 provides pre-processed network growth analysis information to RGM 306 for generating RAN growth planning information and CGM 308 for generating core network growth planning information. The DPM 304 may perform data validation functions, baseline calculations, and the like, as well as various combinations thereof. In one embodiment, DPM 304 may perform data translation functions, data formatting functions, and the like, as well as various combinations thereof (in order to prepare the network growth analysis information for use by RGM 306 and CGM 308).

In one embodiment, DPM 304 correlates network growth analysis information and actual traffic information. In one embodiment, DPM 304 correlates network configuration information and network inventory information and, optionally, highlights discrepancies or potential discrepancies. In one embodiment, DPM 304 correlates network configuration information and actual traffic information, and, optionally, highlights discrepancies or potential discrepancies. For example, in one embodiment, DPM 304 correlates actual traffic and physical and logical network components assigned to support that actual traffic. The correlation of actual traffic and physical and logical network components may include aligning the actual traffic and the physical and logical network components assigned to support that actual traffic. In one embodiment, DPM 304 validates RAN configuration information against core network configuration information and, optionally, highlights discrepancies or potential discrepancies.

In one embodiment, DPM 304 computes baseline calculations representing current network conditions of the RAN and core networks. In one embodiment, for example, DPM computes current remaining capacity, and capacity bottlenecks and/or potential capacity bottlenecks, for RAN components, backhaul capacity components (e.g., packet pipes), core network components, and the like, as well as various combinations thereof. In the RAN domain, capacity bottlenecks occur at the air interfaces (i.e., requiring additional wireless carriers and associated transceivers), base stations (i.e., requiring additional cards, e.g., CEs, CCUs, and the like for CDMA), and packet pipes (assuming packet pipes are modeled as a portion of the RAN domain). In the core domain, capacity bottlenecks occur at the DCSs (e.g., SMs, DLTUs/DNUSs, PSUs, PHs, and the like for CDMA), ECPs (e.g., RNs, APs, and the like for CDMA).

The DPM 304 provides pre-processed network growth analysis information to RGM 306 and CGM 308. In one embodiment, DPM 304 may generate network optimization information. In one such embodiment, for example, DPM 304 may generate various network optimization reports indicating ways in which the current network configuration (including current network inventory, capacity, connectivity, and the like) may be modified to better support the actual traffic currently supported by the network. For example, DPM 304 may determine, and produce one or more reports or recommendations indicating, that by consolidating packets associated with each DCS, fewer SMs may be required per DCS in order to support the actual traffic currently supported by the network. Although described with respect to a specific example, DPM 304 may generate reports and recommendations for any optimization of a current network configuration to support actual traffic currently transported by the current network configuration.

The RGM 306 performs network growth planning for the RAN using pre-processed information from DPM 304, generating therefrom RAN growth planning information associated with the RAN. The RGM 306 performs network growth planning for the RAN using network growth analysis information including network configuration information, actual traffic information, and forecast traffic information. The RGM 306, knowing the current RAN capacity and utilization of that capacity by actual network traffic, determines additional RAN capacity required in order to support both the actual network traffic and the forecast network traffic (i.e., RGM 306 determines growth required in the RAN to support forecast network traffic).

The RGM 306 determines current RAN capabilities and current and/or potential RAN bottlenecks. The RGM 306 determines numbers, types, sizes, and connectivity of network components (e.g., network elements (including modules, cards, and the like), network links, and the like, as well as various combinations thereof) required in the RAN (and, optionally, the associated backhaul network) in order to meet forecasted capacity requirements determined using the actual and forecast traffic information, desired quality of service requirements, and the like. In one embodiment, RGM 306 performs network growth planning for the RAN by determining current RAN utilization and growing the RAN components to meet quality of service targets based on the actual and forecast traffic information.

In one embodiment, RGM 306 may determine network growth planning information associated with wireless carriers, base stations, and packet pipes using various RAN growth analysis parameters. The RAN growth analysis parameters may include various limit settings such as engineered blocking rates, air interface (AIF) engineering limits, CCU utilization engineering limits, allowed proportion of 3G to 2G assignments, peak supplemental channel (SCH) rate reduction at full load, packet pipe utilization engineering limit, 2G voice capacity limit (e.g., in Erlangs), 3G voice capacity limit (e.g., in Erlangs), 3G high-speed packet data (HSPD) forward capacity limit, 3G HSPD reverse capacity limit, minimum supplemental channel average channel element per burst, and the like, as well as various combinations thereof.

The RAN growth analysis parameters may further include options to activate inactive carriers immediately or delay activation of inactive carriers until traffic grows, options to grow traffic into inactive carriers or leave inactive carriers alone, options to cluster or not cluster carriers when new carriers are added, options to distribute or not distribute carrier traffic if air interface triggers are satisfied, options to specify which network components may or may not be grown, options to specify orderings in which network components should preferably be grown (e.g., grow cheaper elements first, grow larger capacity elements first, and the like), options to use or not use discrete packet pipe sizes (e.g., only use packet pipes including one, four, eight, or sixteen DS0s, or other discrete groupings of channels), and the like, as well as various combinations thereof.

In one embodiment, RGM 306 may determine current RAN utilization by measuring air interface utilization. For example, RGM 306 may compare actual traffic (e.g., measured traffic volume) against wireless carrier capacity (e.g., transceiver capacity). In one embodiment, current RAN utilization may be determined by measuring network component utilization. For example, RGM 306 may compare actual traffic volumes against network element hardware capacity (e.g., transceiver capacity, channel element capacity, channel card capacity, controller card processing capacity, and the like), link capacity (node-to-node link capacity, backhaul link capacity, and the like), and the like, as well as various combinations thereof. In one embodiment, current RAN utilization may be determined by identifying excess network resources available for redeployment (e.g., redirecting network resources from a discontinued service to support other network functions or services).

In one embodiment, RGM 306 may grow the RAN components to meet quality of service targets based on actual and forecast traffic information by considering traffic over multiple forecast iterations (i.e., iterations i=0, 1, . . . , n, where iteration 0 denotes the current baseline iteration). The forecast iterations may be specific dates, ranges of dates (e.g., weeks, months, years), and the like, as well as various combinations thereof. For example, forecast iterations may correspond to the first Monday of each month over a one year period, or, in another example, may correspond to each quarter (e.g., January-March and so on) over multiple years.

Although described with respect to specific forecast iterations, various other forecast iterations may be utilized for generating RAN growth planning information. In one embodiment, during each forecast iteration, RGM 306 analyzes network growth analysis information.

The RGM 306 determines network growth planning information associated with wireless carriers, base stations, and packet pipes using network configuration information and actual and forecast traffic information. The RGM 306 determines the actual number of carriers required per sector/face, and additional air-interface capacity is added to cells in the form of new wireless carriers as needed (optionally using a carrier clustering method). The RGM 306 redistributes the actual and forecast traffic across the existing and new wireless carriers. The RGM 306 determines the actual numbers and types of cards (e.g., CCU cards in CDMA) required (e.g., per RF wireless carrier), and additional capacity (e.g., CE capacity in CDMA) is added in the form of new cards (or cards in excess are flagged and removed). The RGM 306 determines the actual number and size of packet pipes required (e.g., per RF wireless carrier). The RGM 306 may then apply additional growth (using forecast traffic information) for other forecast iterations.

In one embodiment, during each forecast iteration, RGM 306 determines the actual number of wireless carriers required (e.g., per network element, per cell, and on various other scales) to support the actual and forecast traffic associated with that forecast iteration, and, if needed, additional air-interface capacity is added in the form of new wireless carriers. In one embodiment, RGM 306 may model effects of handoff borders using one or more of a variety of carrier clustering methods. This processing provides per component utilization and, optionally, flags excess hardware for removal. In one embodiment, during each forecast iteration, after determining per component utilization and adding additional air-interface capacity in the form of new wireless carriers, RGM 306 redistributes the traffic (as determined from the traffic forecast associated with the forecast iteration) across all carriers including both the existing and the newly added carriers.

In one embodiment, during each forecast iteration, RGM 306 determines the numbers, types, sizes, and connectivity of each network element, as well as the numbers and types of each network component associated with each network element (e.g., line cards, processor cards, and the like), required to support the actual and forecast traffic. For example, RGM 306 may determine the numbers, types, and sizes of Channel Card Unit (CCU) cards required to support actual and forecast traffic. The numbers, types, sizes, and connectivity of network elements (and network components of which the network elements are composed) may be determined using capacity information derived using the actual number of wireless carriers required to support the actual and forecast traffic associated with that forecast iteration, and, optionally, redistribution information indicative of redistribution of the actual and forecast traffic across both existing and new wireless carriers. In one embodiment, the numbers, types, sizes, and connectivity of network components may be determined per region, per cell, per network element (e.g., per base station), and the like, as well as various combinations thereof).

In one embodiment, during each forecast iteration, RGM 306 determines the numbers, types, sizes, and connectivity of packet pipes required to transport actual and forecast traffic between the RAN and the core network. The numbers, types, sizes, and connectivity of packet pipes required to support actual and forecast traffic may be determined from the numbers, types, sizes, and connectivity of each network element (including similar information associated with the network components of which the network elements are composed) in the RAN. In one embodiment, the numbers, types, sizes, and connectivity of packet pipes may be determined per network element (e.g., per base station, per RF carrier, and the like, as well as various combinations thereof). In one further embodiment, RGM 306 may additionally determine backhaul network information (e.g., numbers, types, sizes, and connectivity of backhaul networks and communication links required to support the packet pipes).

As described herein, RGM 306 produces RAN growth planning information. In one embodiment, the output of each forecast iteration includes RAN growth planning information. As described herein, RAN growth planning information includes information for growing wireless carriers, base stations, and packet pipes in order to support actual traffic and forecast traffic. The RAN growth planning information output by RGM 306 may include RAN traffic information, RAN air interface information, RAN amplifier information, RAN channel element information, RAN channel card information, RAN packet pipe information, and the like, as well as various combinations thereof.

The RAN traffic information output by RGM 306 may include amounts of voice traffic (e.g., 2G voice traffic, 3G voice traffic, and the like), amounts of data traffic (e.g., forward and reverse channels), amounts of forward error correction (FEC) traffic, and the like, as well as various combinations thereof. The RAN air interface information output by RGM 306 may include numbers of sectors optimally equipped, over-dimensioned, under-dimensioned, and the like. The RAN air interface information may include numbers of wireless carriers, such as numbers of current wireless carriers per sector, numbers of wireless carriers per sector in excess, numbers of wireless carriers per sectors required to be added, numbers of wireless carriers per sector required to be deleted, and the like, as well as various combinations thereof. The RAN amplifier information output by RGM 306 may include numbers of sectors with different types of amplifiers (e.g., F1, F2, F3, F4, and like amplifiers, as well as various combinations thereof).

The RAN channel element information output by RGM 306 may include numbers, types, and sizes of channel elements required (e.g., per base station, per cell region, and the like) to be added, deleted, and/or reconfigured. The RAN channel card information output by RGM 306 may include the numbers of carriers optimally equipped, the number of over-dimensioned and under-dimensioned carriers, total number of starting cards, total number of cards in excess, total number of optimal cards, total number of cards which must be added, total number of cards which must be changed, and the like, as well as various combinations thereof. In one embodiment, RAN channel card information may be grouped according to one or more of cell area, network equipment type, card type (e.g., CCU20s, CCU32s, CCU64s, and the like), and the like, as well as various combinations thereof).

The RAN packet pipe information output by RGM 306 may include the numbers of carrier per packet pipes optionally equipped, numbers of carriers per packet pipes over-dimensioned, numbers of carriers per packet pipes under-dimensioned, total numbers of logical paths (e.g., DS0s) to decrease and increase, total starting, optimal, and changed logical paths (e.g., DS0s), and the like, as well as various combinations thereof. The RAN packet pipe information may include, for each packet pipe (both original and newly added), one or more of the logical path (e.g., DS0) size for each packet pipe throughout the study period (i.e., over each forecast iteration), voice and data traffic forecasts for each packet pipe throughout the study period, average data throughput rates (e.g., per 3G1X call) for each packet pipe throughout the study period, and the like, as well as various combinations thereof.

The CGM 308 performs network growth planning for the core network using pre-processed information from DPM 304 and RAN growth planning information from RGM 306, generating therefrom core network growth planning information associated with the core network. The CGM 308, knowing the current core network configuration and associated capacity, and utilization of that capacity by actual network traffic, as well as forecast network traffic transported over packet pipes between the RAN and core network, determines additional core network capacity required in order to support both the actual network traffic and the forecast network traffic (i.e., CGM 308 determines growth required in the core network to support forecast growth in the RAN due to forecast network traffic).

The CGM 308 receives pre-processed network growth analysis information from DPM 304. The pre-processed network growth analysis information received by CGM 308 from DPM 304 may include network inventory information, network configuration information, network capacity information, network traffic information, and the like, as well as various combinations thereof, for the core network. The CGM 308 receives RAN growth planning information from RGM 306. The RAN growth planning information received by CGM 308 from RGM 306 may include information indicative of the amount of traffic forecasted to be backhauled between the RAN and the core network (e.g., information about logical paths (e.g., packet pipes) between the RAN and the core network.

In one embodiment, pre-processed network growth analysis information received by CGM 308 from DPM 304 may include a summary (by ECP, DCS, SM, or DLTU/DNUS) of all digital signal carriers (e.g., DS1s, DS3s, and the like) by category (e.g., from packet pipes, loop-arounds, TDMA, PSTN, SS7, Interworking Mobile Switching Center (IMSC), and the like, as well as various combinations thereof). In one embodiment, pre-processed network growth analysis information received by CGM 308 from DPM 304 may include a summary, (by ECP, DCS, SM, or PSU) of protocol handlers (by type, such as 5ESS SWITCH Protocol Handler Version 4 (PH4) circuit packs, 5ESS SWITCH Protocol Handler Version 22 (PH22) circuit packs, 5ESS SWITCH Protocol Handler for Voice (PHV) circuit packs, 5ESS SWITCH Protocol Handler for Data (DPH) circuit packs, 5ESS SWITCH Frame Relay Protocol Handler (FRPH) circuit packs, packet pipes, and the like, as well as various combinations thereof).

In one embodiment, pre-processed network growth analysis information received by CGM 308 from DPM 304 may include a summary of mappings between PSUs and PHs for each of the SMs in each of the DCSs. In one embodiment, pre-processed network growth analysis information received by CGM 308 from DPM 304 may include listings of protocol handlers (e.g., PH4, PH22, PHV, DPH, FRPH, and the like, as well as various combinations thereof) and the associated packet pipe assignments. In one embodiment, pre-processed network growth analysis information received by CGM 308 from DPM 304 may include mappings of packet pipes to the digital signal carriers on which the packet pipes are transported (e.g., mappings between packet pipes and associated DS1 identifiers). In one embodiment, pre-processed network growth analysis information received by CGM 308 from DPM 304 may include primary Erlangs of each packet pipe.

In one embodiment, RAN growth planning information received by CGM 308 from RGM 306 may include, for each packet pipe (both original and newly added), one or more of the logical path (e.g., DS0) size for each packet pipe throughout the study period (i.e., over each forecast iteration), voice and data traffic forecasts for each packet pipe throughout the study period, average data throughput rates (e.g., per 3G1X call) for each packet pipe throughout the study period, and the like, as well as various combinations thereof. In one embodiment, other information indicative of the traffic backhauled between the RAN and the core network may be received by CGM 308 from RGM 306.

The CGM 308 determines current core network capabilities and current and/or potential core network bottlenecks. The CGM 308 determines numbers, types, sizes, and connectivity of network components (e.g., network elements (including modules, cards, and the like), network links, and the like, as well as various combinations thereof) required in the core network in order to meet forecasted capacity requirements determined using the pre-processed network growth analysis information from DPM 304, RAN growth planning information from RGM 306, as well as various other parameters such as actual and forecast traffic information, desired quality of service requirements, and the like, as well as various combinations thereof. In one embodiment, CGM 308 performs network growth planning for the core network by determining current core network utilization and growing the core network components to meet forecast traffic targets, quality of service targets, and the like, as well as various combinations thereof.

In one embodiment, during each forecast iteration (corresponding to respective forecast iterations associated with RGM 306), CGM 308 performs network growth analysis for the core network. In one embodiment, CGM 308 determines numbers, types, sizes, and configurations of network elements (e.g., DCSs, ECPs, and the like), and associated network element components (e.g., components of DCS network elements, such as DLTUs/DNUSs, PSUs, PHs, and the like; components of ECP network elements, such as RNs, APs, and the like; and the like), for network elements in the core network. In one embodiment, during each forecast iteration, CGM 308 may perform various functions in order to perform the network growth analysis for the core network.

In one embodiment, during each forecast iteration, CGM 308 may perform a provisioning and assignment process for packet handlers (e.g., frame relay packet handlers (FRPHs), asynchronous transfer mode (ATM) packet handlers (APHs), and the like), packet switching units (PSUs), switching modules (SMs), and the like, as well as various combinations thereof. In one embodiment, CGM 308 may perform the provisioning and assignment process using communication link information (e.g., capacity information, utilization information, and the like, as well as various combinations thereof). In one such embodiment, for example, CGM 308 may perform the provisioning and assignment process using backhaul link information (i.e., packet pipe information) which may be obtained from one or more of DPM 304 and RGM 306.

In one embodiment, during each forecast iteration, CGM 308 may determine new core switch and/or switching module requirements (which may be collectively denoted herein as new core switching requirements). In one embodiment, core switching requirements may include core DCS switching requirements for DCS portions of the core network (e.g., switching modules, portions of switching modules such as DLTUs (or DNUSs), PSU2s, PHs, and the like, as well as various combinations thereof). In one embodiment, core switching requirements may include core ECP switching requirements for ECP portions of the core network (e.g., various nodes, application processors (APs), and various other associated networks such as CDNs, EINs, SS7Ns, and the like, as well as various combinations thereof). In one embodiment, CG 208 may determine core switching requirements using at least a portion of the outputs of the provisioning and assignment process.

In one embodiment, for example, core DCS switching requirements may include numbers of protocol handlers (protocol handlers for CDMA voice (PHVs), protocol handlers for CDMA data (PHD) such as FRPHs, APHs, and the like, as well as various combinations thereof), numbers of interworking function (IWF) servers, numbers of digital facility interfaces (DFIs) and/or Synchronous Transport Signals (STSs), numbers of digital cross-connect systems (DCSs) and associated trunking, and the like, as well as various combinations thereof. In one embodiment, for example, core ECP switching requirements may include requirements of content delivery networks (CDNs) and associated links, requirements of experimental integrated networks (EINs) and associated links, requirements of Signaling System 7 networks (SS7Ns) and associated links, and the like, as well as various combinations thereof.

In one embodiment, during each forecast iteration, CGM 308 may determine new core switch module requirements. The CGM 308 determines new core switch module requirements using new DFI requirements. The CGM 308 determines new DFI requirements using at least a portion of the outputs of the provisioning and assignment process and new core switching requirements. The new DFI requirements may include requirements for numbers of communication links/facilities (e.g., packet pipe links, TDMA links, PSTN links, and the like (where links may include DS0s, DS1s, and the like), as well as various combinations thereof). In one embodiment, new core switch module requirements may be determined per switching module, per switch, where switching modules may include various switching modules such as requirements for numbers of DLTUs, DNUSs, and like modules, as well as various combinations thereof.

The RAN and core network growth planning information output by RGM 306 and CGM 308, respectively, may be organized in various manners. In one embodiment, network growth planning information may be organized in a manner enabling simple comparisons between network growth planning information associated with different forecast iterations. The network growth planning information may be organized in various formats (e.g., using tables, bar charts, and the like, as well as various combinations thereof). In one embodiment, network growth planning information may be displayed to one or more users (e.g., network planners, network engineers, and the like) using one or more management system, or, optionally, may be exported from one or more management systems or associated databases for display to users. Although described with respect to specific organization and formatting, network growth planning information may be organized and formatted in various other manners. FIG. 4 depicts exemplary reports including RAN growth planning information and core network growth planning information.

Figure 4A:
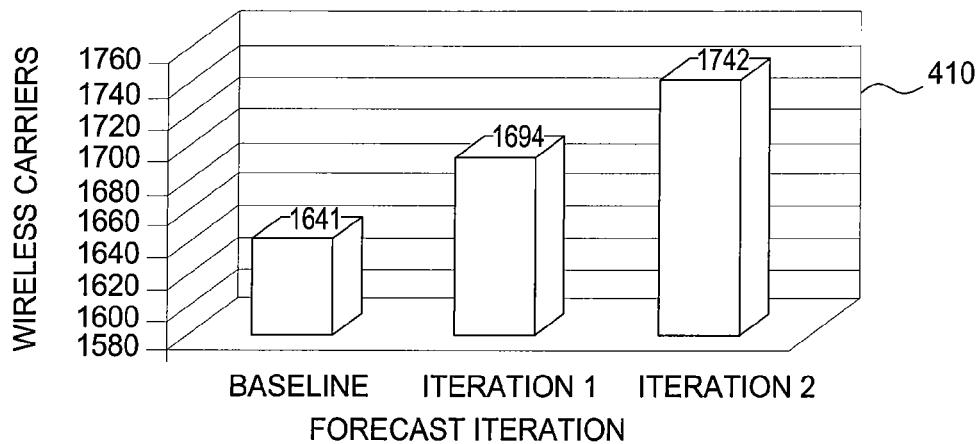
FIG. 4A depicts three exemplary reports including RAN growth information.
Figure 4A:
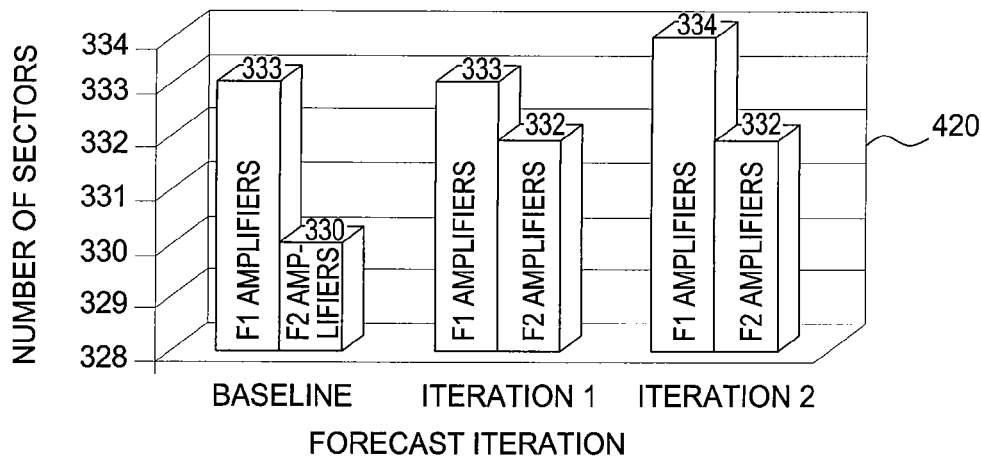
Figure 4A:
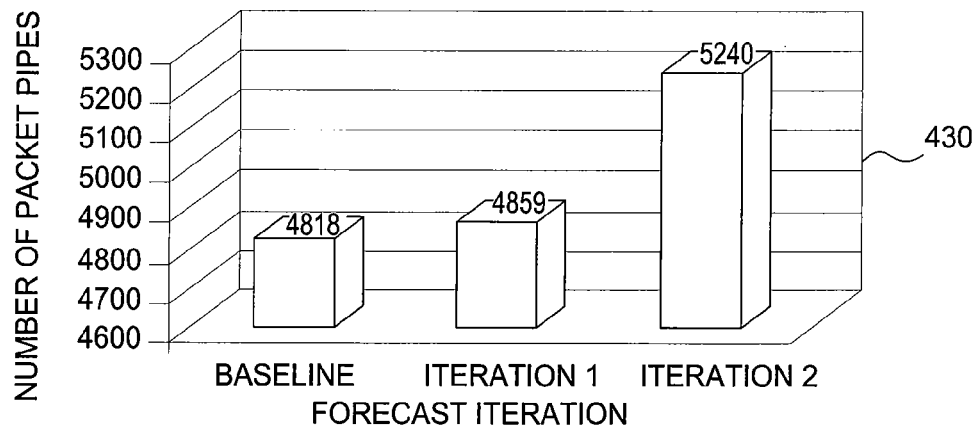

FIG. 4A depicts three exemplary reports including RAN growth information. Specifically, FIG. 4A depicts a report 410 including a number of wireless carriers per sector, a report 420 including a number of sectors having specific amplifiers (illustratively, the number of sectors having F1 amplifiers and the number of sectors having F2 amplifiers), and a report 430 including packet pipe statistics (illustratively, the number of packet pipes required between the RAN and core networks). The reports 410, 420, and 430 each include statistics for a baseline iteration (i.e., according to actual traffic currently supported by the RAN), a first forecast iteration (i.e., according to a first traffic forecast), and a second forecast iteration (i.e., according to a second traffic forecast).

FIG. 4B depicts one exemplary report including core network growth information. Specifically, FIG. 4B depicts a report 440 including core network growth statistics for a baseline iteration, a first forecast iteration, and a second forecast iteration, which may correspond to the baseline iteration and first and second forecast iterations depicted and described with respect to FIG. 4A. The core network growth statistics include total SMs, total PSUs, total numbers of various different versions of PHs, total primary data Erlangs, and the like, as well as various combinations thereof. The core network growth statistics may be reported for each DCS, for each central office including one or more DCS, for the core network, and the like, as well as at various other reporting levels.

As described herein with respect to FIG. 3, RAN growth information may include any information about wireless carriers, RAN hardware, and packet pipes. The RAN growth reports generated from the RAN growth information may include any combination of RAN growth information. The RAN growth reports depicted in FIG. 4A are merely examples. Similarly, as described herein with respect to FIG. 3, core network growth information may include any information about core hardware, facility interfaces, facilities, and the like, as well as various combinations thereof. The core network growth reports generated from the core network growth information may include any combination of core network growth information. The core network growth report depicted in FIG. 4B is merely an example.

Figure 5:
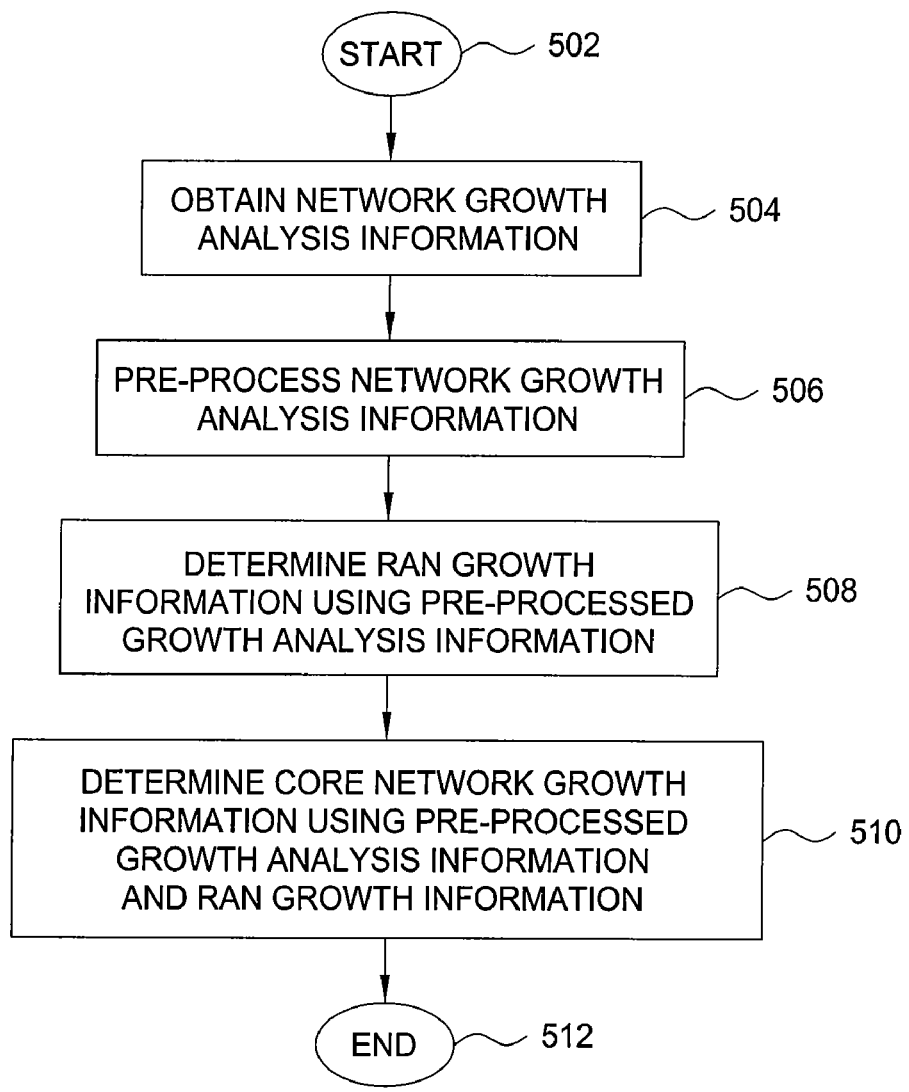
FIG. 5 depicts a method according to one embodiment of the present invention.

FIG. 5 depicts a method according to one embodiment of the present invention. Specifically, method 500 includes a method for determining RAN growth information and core network growth information. Although depicted and described with respect to determining both RAN and core network growth information, in one embodiment, only RAN growth information may be determined. Although depicted and described as being performed serially, at least a portion of the steps of method 500 may be performed contemporaneously, or in a different order depicted in FIG. 5. The method 500 may be better understood with respect to FIG. 3 and FIG. 6. The method 500 begins at step 502 and proceeds to step 504.

At step 504, network growth analysis information is obtained. At step 506, the network growth analysis information is pre-processed. At step 508, RAN growth information is determined using the pre-processed growth analysis information. At step 510, core network growth information is determined using the pre-processed growth analysis information and the RAN growth information. At step 512, method 500 ends. Although omitted for purposes of clarity, as described herein, in one embodiment, in which network growth planning is performed over multiple forecast iterations, steps 508 and 510 may each be repeated for each forecast iteration using information associated with that forecast iteration (e.g., actual traffic information, forecast traffic information, and the like, as well as various combinations thereof).

Figure 6:
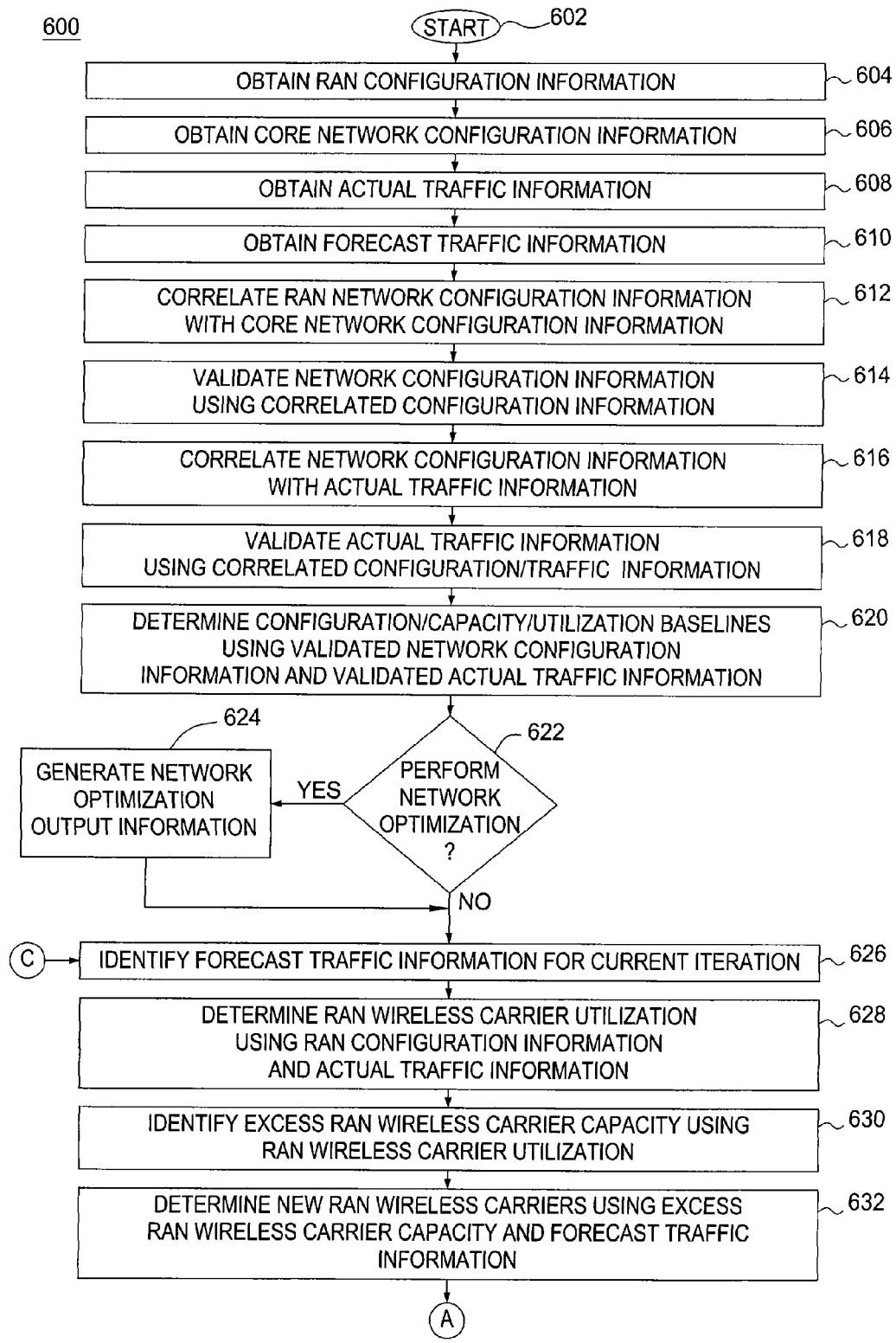
FIG. 6 depicts a method according to one embodiment of the present invention.
Figure 6:
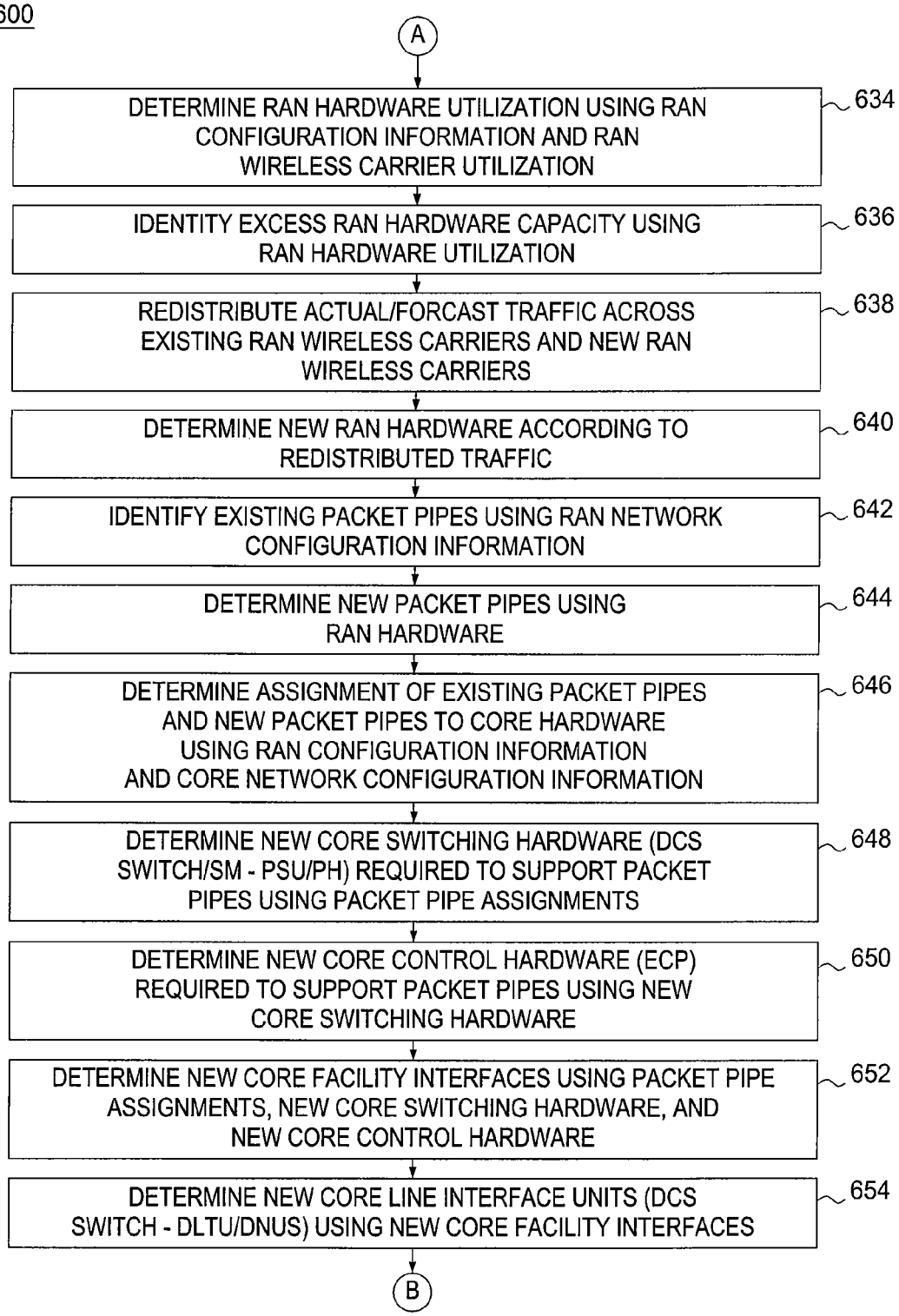
Figure 6:
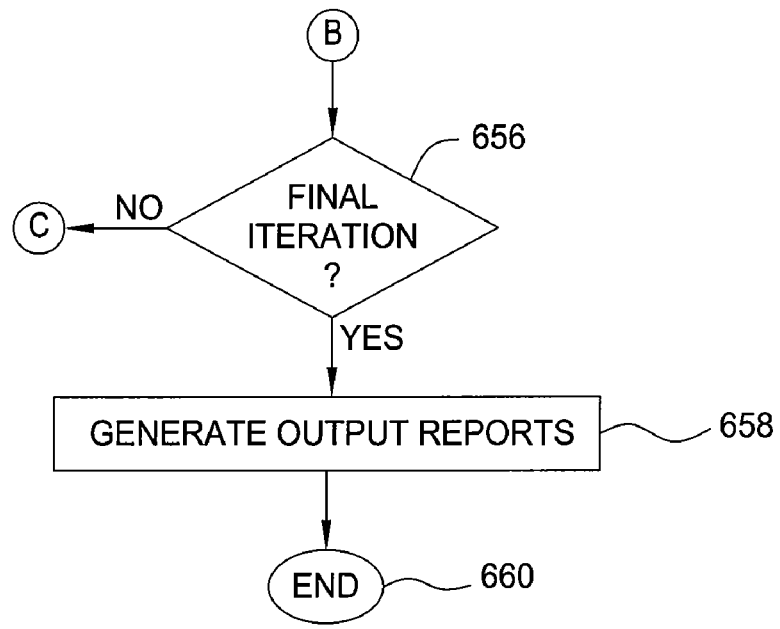

FIG. 6 depicts a method according to one embodiment of the present invention. Specifically, method 600 includes a method for determining RAN growth information and core network growth information. Although depicted and described with respect to determining both RAN and core network growth information, in one embodiment, only RAN growth information may be determined. Although depicted and described as being performed serially, at least a portion of the steps of method 600 may be performed contemporaneously, or in a different order depicted in FIG. 6. The method 600 may be better understood with respect to FIG. 3. The method 600 begins at step 602 and proceeds to step 604.

At step 604, RAN configuration information is obtained. At step 606, core network configuration information is obtained. At step 608, actual traffic information is obtained. The actual traffic information includes information indicative of actual traffic currently supported by the RAN. At step 610, forecast traffic information is obtained. The forecast traffic information includes information indicative of traffic forecast to be supported by the RAN. The actual and forecast traffic information may include traffic amounts (e.g., bandwidth consumed for voice traffic, bandwidth consumed for data traffic), traffic locations (e.g., which carriers, base stations, switches, and like support specific portions of the traffic), and the like, as well as various combinations thereof.

At step 612, the RAN configuration information and core network configuration information are correlated (which may include alignment of the information, as well as other processing to correlate various portions of the information). At step 614, network configuration information is validated using the correlation of the RAN configuration information and the core network configuration information. At step 616, the network configuration information (RAN and, optionally, core) and the actual traffic information are correlated (which may include alignment of the information, as well as other processing to correlate various portions of the information). At step 618, the actual traffic information is validated using the correlation of the network configuration information and the actual traffic information.

The correlation and associated validation of data is performed to ensure the accuracy of the network configuration information and traffic information prior to processing performed to determine RAN growth information and core network growth information. At step 620, configuration/capacity/utilization baselines are determined using the validated network configuration information and the validated actual traffic information. The baselines serve as a starting point from which the RAN and core networks may be grown according to the forecast traffic information in order to determine the effects of the forecast traffic information on the RAN and core networks.

At step 622, a determination is made as to whether to perform network optimization. If network optimization is not performed, method 600 proceeds to step 626. If network optimization is performed, method 600 proceeds to step 624. At step 624, network optimization output information is generated. The network optimization may be performed using various combinations of the validated network configuration and traffic information and the configuration/capacity/utilization baselines. The network optimization may include any information which may be used by the service provider to optimize the RAN and/core networks using existing network resources (e.g., consolidating existing packet pipes on fewer DCSs or fewer SMs per DCS, consolidating RAN traffic on fewer wireless carriers per base station, and the like, as well as various combinations thereof. From step 624, method 600 proceeds to step 626.

At step 626, the portion of the forecast traffic information associated with the current forecast iteration is identified. In one embodiment, the forecast traffic information for the current forecast iteration includes additional traffic forecast to be carried on the RAN as compared with the baseline iteration (i.e., additional traffic for the current forecast iteration as well as all previous forecast iterations). In one embodiment, the forecast traffic information for the current forecast iteration includes additional traffic forecast to be carried on the RAN as compared with the forecast traffic information for the previous forecast iteration (i.e., additional traffic for the current forecast iteration only).

At step 628, RAN wireless carrier utilization is determined (e.g., for each wireless carrier in the RAN). The RAN wireless carrier utilization may be determined using the RAN configuration information and the actual traffic information. At step 630, excess RAN wireless carrier capacity is identified. The excess RAN wireless carrier capacity may be determined using the RAN wireless carrier utilization. At step 632, new RAN wireless carriers are determined. The new RAN wireless carrier may be determined using the excess RAN wireless carrier capacity and the forecast traffic information. The new RAN wireless carriers include additional RAN wireless carrier required to support the portion of the forecast traffic (or, optionally, all of the forecast traffic or even portions of the actual traffic if the RAN is currently over provisioned) which cannot be supported by existing RAN wireless carriers.

At step 634, RAN hardware utilization is determined. The RAN hardware utilization may be determined using the RAN configuration information and the RAN wireless carrier utilization. At step 636, excess RAN hardware capacity is determined using the RAN hardware utilization. At step 638, the actual traffic and the forecast traffic is redistributed across the existing and new RAN wireless carriers. At step 640, new RAN hardware is determined according to the redistributed traffic. The redistribution of the actual and forecast traffic across the new RAN carriers enables a determination as to the RAN hardware required to support the RAN carriers. As described herein, the RAN hardware, which may vary according to wireless technology used in the RAN, may include transceivers, amplifiers, base station line cards, and the like, as well as various combinations thereof.

At step 642, existing packet pipes are identified. In one embodiment, existing packet pipes may be identified using the RAN configuration information and the actual traffic information. In one embodiment, existing packet pipes may have been identified during correlation of RAN configuration information and core network configuration information (e.g., during correlation processing as described herein with respect to step 612). At step 644, new packet pipes are determined. The new packet pipes may be determined using the new RAN hardware (since the new RAN hardware requires associated backhaul connectivity to transport traffic to the core network), and, optionally, the existing RAN hardware (for cases in which existing RAN hardware was only partially utilized and there is capacity on existing RAN hardware to support additional packet pipes. Although primarily described with respect to packet pipes, similar determinations may be made for other logical paths and, optionally, associated backhaul carriers, providing backhaul from the RAN to the core network.

At step 646, assignment of existing packet pipes and new packet pipes to core network hardware is determined. The assignment of existing and new packet pipes to core network hardware may be determined using RAN configuration information and the core network configuration information. In one embodiment, assignment of existing and new packet pipes to core network hardware may be determined at the network element level (e.g., per packet switching element in the circuit/packet switch such that there is a mapping of each packet pipe to the packet switch on which the packet pipe terminates, not necessarily (although possibly) to the specific switching module or DLTU/DNUS on which the packet pipe terminates).

At step 648, new core network switching hardware (e.g., DCS SWITCH/SM-PSU/PH) required to support the existing and new packet pipes is determined. The new core network switching hardware may be determined using the packet pipe assignments. At step 650, new core network control hardware (e.g., ECP) required to support the existing and new packet pipes is determined. The new core network control hardware may be determined using the new core switching hardware. The new core network switching hardware and the new core network control hardware may include any core switching and control hardware described herein (e.g., PHVs, DPHs, IFRPHs, interworking function servers, SS7 links, CDNs, EINs, and the like, as well as various combinations thereof).

At step 652, new core network facility interfaces are determined. The new core network facility interfaces may be determined using the packet pipe assignments, the new core network switching hardware, and the new core network control hardware. The new core network facility interfaces may include packet pipe DS1s, TDMA DS1s, PSTN DS1s, and the like, as well as various combinations thereof. At step 654, new core network line interface units (e.g., DCS-SWITCH-DLTU/DNUS) are determined. The new core network line interface units may be determined using the new core network facility interfaces. In one embodiment, the new core network line interface units may be determined per switch and, optionally, per SM.

At step 656, a determination is made as to whether the current forecast iteration is the final forecast iteration. If the current iteration is not the final forecast iteration, method 600 returns to step 626, at which point forecast traffic information is determined for the next forecast iteration. If the current iteration is the final forecast iteration, method 600 proceeds to step 658. At step 658, output reports are generated. The output reports may include RAN growth information and/or core network growth information. The RAN growth information and core network growth information determined using method 600 (or similar methods), as well as the output reports in which such RAN and/or core network growth information is organized may be better understood with respect to FIG. 3 and FIG. 4. At step 660, method 600 ends.

The network growth planning (i.e., capacity planning) methodology of the present invention accounts for network component interactions across network portions (e.g., between RAN and core network portions) by utilizing the output of the RAN capacity planning module (at the cell level, network component level, or the like) as input to the core capacity planning module. In one embodiment, the core capacity planning module may determine over-utilization of all affected network components. In one embodiment, the core capacity planning module may rehome (i.e., reconfigure) cell level traffic to make best use of existing network components. In one embodiment, the core capacity planning module may minimize additional network components required to relieve over-utilization of network components.

The network growth planning methodology of the present invention, by modeling network element interaction at the functional level, ensures that all network components are engineered using the same assumptions, and that capacity effects are based on common sets of traffic growth forecasts (unachievable using existing manual methodologies involving numerous engineers working on separate RAN and core functions). The wireless network growth planning methodology of the present invention, by considering and optimizing the configuration of network components (rather than estimating average resource utilization of the main network elements), desired quality of service may be achieved without over-provisioning.

The network growth planning methodology of the present invention supports various services useful to wireless service providers, as well as other service providers, for performing network capacity analysis and associated network growth planning. The network growth planning methodology of the present invention enables just-in-time network growth for wireless service providers attempting to provide sufficient network capacity without over-provisioning, thereby enabling wireless service providers to postpone large capital costs associated with network growth until the actual traffic required to be supported by the network requires such network growth. The network growth planning methodology of the present invention supports network growth planning required for introduction of new services, enabling wireless service providers to understand the implications of associated increases in traffic on the RAN and core networks.

The network growth planning methodology of the present invention enables efficient running and analysis of "what-if" scenarios, enabling wireless service providers to efficiently explore various impacts of different traffic growth scenarios, as well as perform compare/contrast analysis of the different traffic growth scenarios. The network growth planning methodology of the present invention enables network growth planning to be performed at various granularities, as well as over a large range of time frames ranging from days, weeks, months, and even years. The network growth planning methodology of the present invention enables immediate network optimization processing, short-term network growth planning, intermediate-term network growth planning, and long-term network growth planning.

The immediate network optimization processing is useful for determining changes that may be made to the network immediately to more efficiently use existing network capacity to support current network traffic. For example, wireless service providers may determine that, by reorganizing existing packet pipes, additional capacity may be supported on the existing packet pipes, thereby delaying the need for the service provider to provision additional packet pipes for backhaul between the RAN and core networks. The short-term network growth planning is useful for planning for one-time events which may cause significant but temporary changes in existing traffic patterns. For example, wireless service providers must provide adequate wireless coverage, and associated quality of service, for cities supporting major events drawing large numbers of people, such as the Olympics, the Super Bowl, Republican and Democratic National Conventions, the like events. The intermediate-term and long-term growth planning is useful for planning network growth over months and years.

The present invention enables proper dimensioning of RAN components, resulting in significant savings in both RAN and core capital costs, operational costs, and the like, as well as various combinations thereof. The present invention provides a dynamic modeling tool for managing marketing, quality, and investment demands of wireless service providers, enabling reduced complexity and thereby allowing for multiple what-if scenarios to be considered in one or more planning cycles performed using the present invention. For example, the present invention may be used to provide guidance for marketing on a new capped calling promotion (e.g., by determining network costs, impacts on latent capacity, and like factors, as well as various combinations thereof).

The present invention enables evaluation of capital expenditure implications of varying quality of service parameters over various time periods, thereby enabling wireless service providers strategic choices of different ways in which quality of service may be positioned for competitive leverage. For example, capital expenditure and quality of service implications may be evaluated for determining various implications of adding a large nationwide application (e.g., using telemetry modems), thereby enabling wireless service providers or other service providers to quickly model implications of various what-if scenarios (e.g., network configurations, network component configurations, traffic scenarios, and the like, as well as various combinations thereof). Using the present invention, wireless service providers may reduce multiyear capacity planning processes by at least eighty percent, reduce equipment planning cycles by at least fifty percent, and realized like savings, thereby enabling better "just-in-time" deployment planning and, therefore, more efficient asset utilization.

Figure 7:
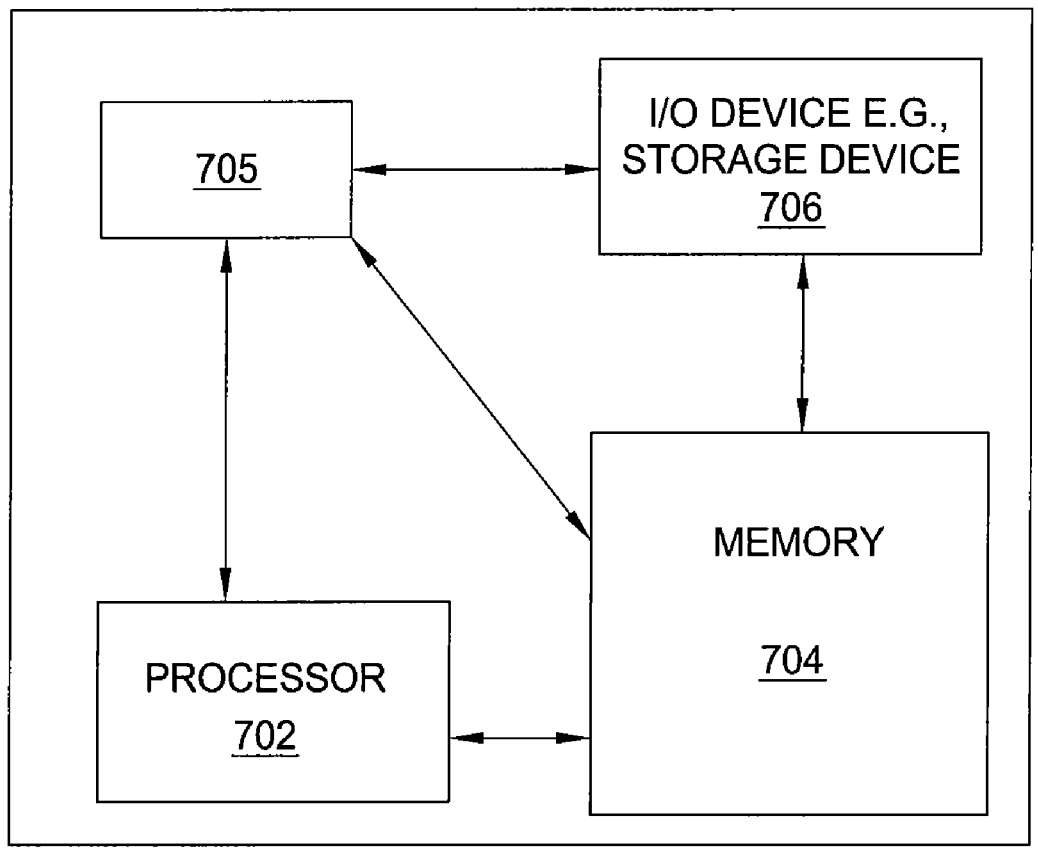
FIG. 7 depicts a high-level block diagram of a general-purpose computer suitable for use in performing at least a portion of the functions described herein.

Although primarily depicted and described herein with respect to CDMA wireless networks, in various other embodiments, the present invention may be adapted for use in capacity planning for various other wireless networks (e.g., TDMA wireless networks, Global System for Mobile Communications (GSM) wireless networks, Universal Mobile Telecommunications System (UMTS) wireless networks, and the like, as well as various combinations thereof). Although primarily depicted and described herein with respect to wireless networks, in various other embodiments, the present invention may be adapted for use in capacity planning for various other networks. Although primarily depicted and described herein with respect to wireless service providers, in various embodiments, the present invention may be used, for performing capacity planning functions, by one or more of wireless network operators, wireline service providers, wireline network operators, and various other companies and organizations, and the like, as well as various combinations thereof FIG. 7 depicts a high-level block diagram of a general-purpose computer suitable for use in performing the functions described herein. As depicted in FIG. 7, system 700 includes a processor element 702 (e.g., a CPU), a memory 704, e.g., random access memory (RAM) and/or read only memory (ROM), a network growth planning module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present network growth planning module or process 705 can be loaded into memory 704 and executed by processor 702 to implement the functions as discussed above. As such, network growth planning process 705 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for determining network growth information for a radio access network (RAN), comprising the steps of:

obtaining, for existing components of the RAN, RAN configuration information comprising RAN component configuration information and RAN component connectivity information;

obtaining traffic information comprising actual traffic information indicative of actual traffic supported by the RAN and forecast traffic information indicative of forecast traffic forecasted to be supported by the RAN;

determining network growth requirements using cross-element capacity analysis wherein changes to capacity requirements of a specific network element are adapted to determine changes to capacity requirements of one or more network elements associated with the specific network element;

determining, using the RAN configuration information and the actual traffic information, RAN utilization information comprising information indicative of utilization of existing components of the RAN; and determining, using the RAN utilization information and the traffic information, RAN growth information indicating whether at least one additional RAN component is necessary to support the actual and forecast traffic.

2. The method of claim 1, wherein if at least one additional RAN component is necessary to support the actual and forecast traffic, the RAN growth information identifies the at least one additional RAN component necessary to support the actual and forecast traffic.

3. The method of claim 2, wherein the at least one additional RAN component comprises at least one of a wireless carrier, a base station hardware component, and a logical path between the RAN and a core network, wherein the core network comprises a wireline network supporting communications of the RAN.

4. The method of claim 1, wherein the RAN utilization information comprises RAN air interface utilization information and RAN hardware utilization information.

5. The method of claim 1, wherein the step of determining RAN growth information comprises the steps of:

determining, using the RAN utilization information, excess air interface RAN capacity information indicative of excess capacity available for existing components of the RAN; and determining the RAN growth information using the excess RAN capacity information and the traffic information.

6. The method of claim 5, wherein the RAN utilization information comprises RAN air interface utilization information and RAN hardware utilization information, wherein the step of determining-excess RAN capacity information comprises the steps of:

determining excess air interface capacity for the RAN using the RAN air interface utilization information; and determining excess RAN hardware capacity using the RAN hardware utilization information.

7. The method of claim 1, wherein the RAN utilization information comprises RAN air interface utilization information and RAN hardware utilization information, wherein the step of determining RAN growth information comprises the steps of:

determining excess air interface capacity for the RAN using the RAN air interface utilization information;

determining, using the excess air interface capacity and the traffic information, existing and newly identified wireless carriers for use to support the actual traffic and the forecast traffic;

determining excess RAN hardware capacity using the RAN hardware utilization information;

determining redistribution of the actual traffic and the forecast traffic across the existing and newly identified wireless carriers;

determining excess RAN hardware capacity using the RAN hardware utilization information;

determining, using the RAN excess hardware capacity and the existing and newly identified wireless carriers, RAN growth information comprising additional RAN hardware information indicative of additional RAN hardware for use to support the redistributed actual traffic and forecast traffic; and determining, using additional RAN hardware information, existing and newly identified packet pipes for the RAN for use to support the actual traffic and the forecast traffic.

8. The method of claim 1, further comprising the steps of:

determining network configuration information for a core network supporting the RAN, wherein the core network comprises a wireline network supporting communications of the RAN; and determining, using the core network configuration information and at least a portion of the RAN growth information, core network growth information identifying at least one additional core component necessary to support the actual and forecast traffic.

9. The method of claim 8, wherein the step of determining core network growth information comprises the steps of:

determining, using the at least a portion of the RAN growth information, existing packet pipes and newly identified packet pipes between the RAN and the core network necessary to support the actual traffic and the forecast traffic;

determining, using the RAN configuration information and the core network configuration information, assignments of the existing and newly identified packet pipes to existing hardware of the core network; and determining the core network growth information using the assignments of the existing and newly identified packet pipes to the existing hardware of the core network.

10. The method of claim 8, wherein the step of determining core network growth information further comprises the steps of:

determining assignments of existing and newly identified packet pipes to existing hardware of the core network;

determining, using the assignments of the existing and newly identified packet pipes to the existing hardware of the core network, additional circuit switching hardware, additional packet switching hardware, and additional controller hardware necessary in the core network to support the existing and newly identified packet pipes;

determining, using the assignments of the existing and newly identified packet pipes to the existing hardware of the core network and the additional circuit switching hardware, the additional packet switching hardware, and the additional controller hardware of the core network, facility interfaces necessary for the core network to support the existing and newly identified packet pipes; and determining, using the core network facility interfaces, additional line-unit hardware necessary in the core network to support the core network facility interfaces.

11. An apparatus for determining network growth information for a radio access network (RAN), comprising:

means for obtaining, for existing components of the RAN, RAN configuration information comprising RAN component configuration information and RAN component connectivity information;

means for obtaining traffic information comprising actual traffic information indicative of actual traffic supported by the RAN and forecast traffic information indicative of forecast traffic forecasted to be supported by the RAN;

means for determining, using the RAN configuration information and the actual traffic information, RAN utilization information comprising information indicative of utilization of existing components of the RAN;

means for determining, using the RAN utilization information and the traffic information, RAN growth information indicating whether at least one additional RAN component is necessary to support the actual and forecast traffic; and means for determining network growth requirements using cross-element capacity analysis wherein changes to capacity requirements of a specific network element are adapted to determine changes to capacity requirements of one or more network elements associated with the specific network element.

12. A method for determining wireless network growth information for a core network in communication with a radio access network (RAN), comprising the steps of:

determining, for a plurality of packet pipes between the RAN and the core network, packet pipe assignment information indicative of assignment of the packet pipes to existing switching hardware of the core network;

determining, using the packet pipe assignment information, new core switching hardware information indicative of additional switching hardware for use in the core network to support the packet pipes;

determining, using the new core switching hardware information, new core control hardware information indicative of additional control hardware for use in the core network to support the packet pipes; and determining network growth requirements using cross-element capacity analysis wherein changes to capacity requirements of a specific network element are adapted to determine changes to capacity requirements of one or more network elements associated with the specific network element.

13. The method of claim 12, wherein obtaining packet pipe information associated with a plurality of packet pipes between the RAN and the core network comprises the steps of:

determining, for existing components of the RAN, RAN configuration information comprising RAN component configuration information and RAN component connectivity information;

obtaining traffic information comprising actual traffic information indicative of actual traffic supported by the RAN and forecast traffic information indicative of forecast traffic forecasted to be supported by the RAN;

determining, by correlating the actual traffic information and the forecast traffic information with the RAN configuration information, RAN growth information indicating whether at least one additional RAN component is necessary to support the actual and forecast traffic; and determining, using at least a portion of the RAN growth information, the plurality of packet pipes between the RAN and the core network, the packet pipes comprising a plurality of existing packet pipes and a plurality of newly identified packet pipes for supporting the actual traffic and the forecast traffic.

14. The method of claim 12,
wherein determining the packet pipe assignment information indicative of assignments of the packet pipes to existing switching hardware of the core network comprises the step of:
determining assignment of the packet pipes to switching modules (SMs) of at least one switch of the core network.

15. The method of claim 14, wherein determining assignment of the packet pipes to SMs of at least one switch of the core network comprises the step of:
determining assignment of the packet pipes to protocol handlers (PHs) and packet switching units (PSUs) of the SMs of the at least one switch of the core network.

16. The method of claim 15, wherein the new core switching hardware information comprises information identifying at least one of a protocol handler for voice (PHV) and a data protocol handler (DPH).

17. The method of claim 12, further comprising the step of:
determining new core facility interface information indicative of additional facility interfaces for use in the core network to support the packet pipes.

18. The method of claim 17, wherein the new core facility information is determined using the new core switching hardware information and the new core control hardware information.

19. The method of claim 12, further comprising the step of:
determining new core line interface unit information indicative of additional line interface units for use in the core network to support the packet pipes.

20. The method of claim 19, wherein the new core line interface unit information is determined using the new core facility interface information.

21. An apparatus for determining wireless network growth information for a core network in communication with a radio access network (RAN), the apparatus comprising:
means for determining, for a plurality of packet pipes between the RAN and the core network, packet pipe assignment information indicative of assignment of the packet pipes to existing switching hardware of the core network;
means for determining, using the packet pipe assignment information, new core switching hardware information indicative of additional switching hardware for use in the core network to support the packet pipes;
means for determining, using the new core switching hardware information, new core control hardware information indicative of additional control hardware for use in the core network to support the packet pipes; and
means for determining network growth requirements using cross-element capacity analysis wherein changes to capacity requirements of a specific network element are adapted to determine changes to capacity requirements of one or more network elements associated with the specific network element.

22. A method for validating configuration information of a radio access network (RAN), comprising the steps of:
obtaining RAN configuration information of the RAN;
obtaining core network configuration information of a core network supporting the RAN;
correlating the RAN configuration information and the core network configuration information;
determining network growth requirements using cross-element capacity analysis wherein changes to capacity requirements of a specific network element are adapted to determine changes to capacity requirements of one or more network elements associated with the specific network element; and
validating the RAN configuration information based at least in part on the correlation of the RAN configuration information and the core network configuration information.

23. The method of claim 4, wherein the RAN air interface utilization information is determined using the RAN configuration information and the actual traffic information, wherein the RAN hardware utilization information is determined using the RAN air interface utilization information.

* * * * *